(12) United States Patent
Vernet

(10) Patent No.: US 6,412,512 B1
(45) Date of Patent: Jul. 2, 2002

(54) PRESSURE CONTROL VALVE

(75) Inventor: Robert Vernet, Orleix (FR)

(73) Assignee: Giat Industries (FR)

( * ) Notice: Subject to any disclaimer, the term of this patent is extended or adjusted under 35 U.S.C. 154(b) by 0 days.

(21) Appl. No.: 09/719,871

(22) PCT Filed: Sep. 18, 2000

(86) PCT No.: PCT/FR00/01657

§ 371 (c)(1),
(2), (4) Date: Dec. 19, 2000

(87) PCT Pub. No.: WO01/01026

PCT Pub. Date: Jan. 4, 2001

(30) Foreign Application Priority Data

Jun. 24, 1999 (FR) ............................................ N 99.08128

(51) Int. Cl.$^7$ ................................................ F16K 17/14
(52) U.S. Cl. ................................. 137/68.13; 137/68.18; 137/70; 137/467
(58) Field of Search ................................ 137/68.13, 68.18, 137/70, 79, 467

(56) References Cited

U.S. PATENT DOCUMENTS

| 532,874 | A | * | 1/1895 | Gray | 137/70 X |
| 1,914,223 | A | * | 6/1933 | Tyden | 137/70 X |
| 2,620,815 | A | * | 12/1952 | Margraf et al. | 137/70 |
| 2,933,096 | A | * | 4/1960 | Schneider et al. | 137/70 |
| 3,016,015 | A | * | 1/1962 | Filstrup | 137/70 X |
| 3,474,809 | A | * | 10/1969 | Gordon | 137/70 |
| 3,603,333 | A | * | 9/1971 | Anderson | 137/70 |
| 3,618,627 | A | * | 11/1971 | Wagner | 137/73 |
| 3,810,484 | A | * | 5/1974 | Martini | 137/70 |
| 3,874,400 | A | * | 4/1975 | Groh | 137/68.13 |
| 4,457,328 | A | * | 7/1984 | Lins | 137/68.11 |
| 5,012,834 | A | * | 5/1991 | Taylor | 137/70 |

FOREIGN PATENT DOCUMENTS

| DE | 530601 | * | 7/1931 |
| EP | 0766028 | * | 4/1997 |
| FR | 2066764 | * | 8/1971 |
| FR | 2343951 | * | 10/1977 |
| FR | 2644869 | * | 9/1990 |

* cited by examiner

Primary Examiner—John Rivell
(74) Attorney, Agent, or Firm—Parkhurst & Wendel, L.L.P.

(57) ABSTRACT

The invention relates to a pressure control valve 1 for a tank intended to contain a fluid and comprising at least one flap 5 obturating an aperture linking the inside (I) and the outside (E) of the tank, such flap being held in the obturating position by spring means 7 pressing on a support 9, such valve incorporating means 10, 20 allowing the retraction in whole or in part of the spring support 9 such as to reduce the pressure exerted by the spring 7 on the flap 5.

Figure 1:
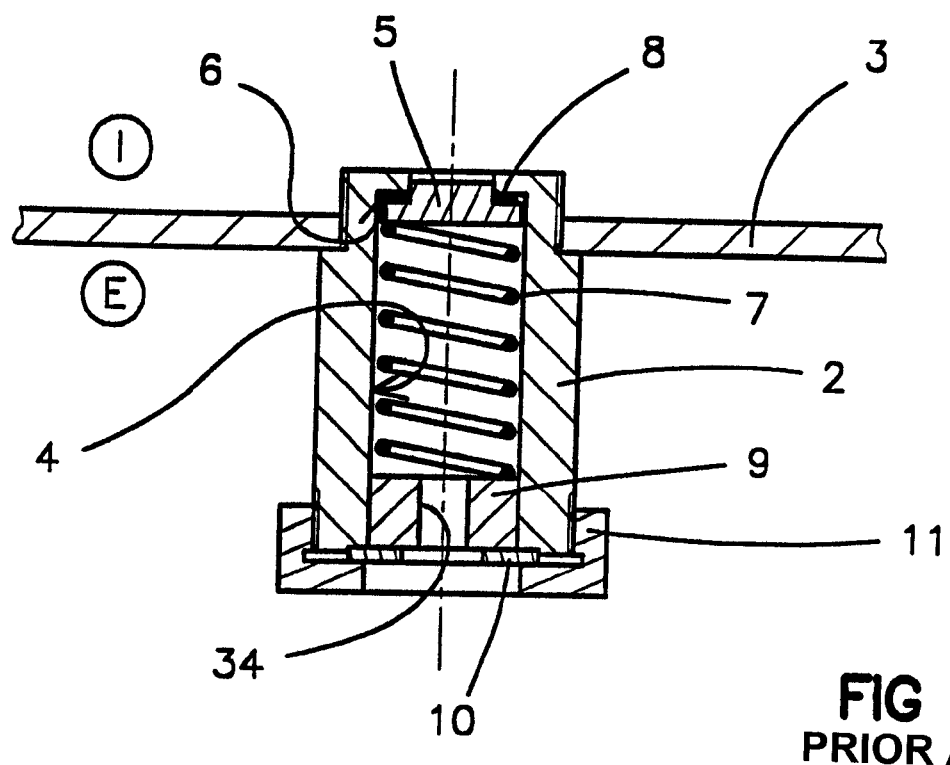

This valve is characterised in that the support 9 has an embrittled part 15 able to be fractured by a mobile piston 20 activated by a pyrotechnic gas generator 27.

7 Claims, 3 Drawing Sheets

US 6,412,512 B1

PRESSURE CONTROL VALVE

The technical scope of the invention is that of pressure control valves for tanks.

The purpose of these valves is to allow the decontainment of tanks or containers containing explosive or inflammable fluids, such decontainment being necessary notably during fires. They are, for example, used in the automobile or aeronautic field to avoid excessive pressure build-up inside the fuel tank. Such pressure build-up resulting, for example, in a temperature build-up during a fire that could cause the tank to explode.

Valves are already known that comprise a flap obturating an aperture linking the inside to the outside of the tank. The flap is held in its obturating position by means of a spring.

When the pressure inside the tank exceeds a certain level (that depends on the spring's taring force) the flap opens thereby reducing the pressure inside the tank. Overpressure due, for example, to limited over-heating caused by meteorological conditions is thus avoided.

The drawback of such a system lies in that it is not able to react quickly enough to a sudden increase in pressure such as could be caused by a fire.

Emergency defueling devices are also known, for example by patent FR2764862, in which a tank wall is pyrotechnically cut open to release its fuel content.

These devices are both cumbersome and costly and do not allow the minor overpressures that occur during normal operation to be reduced.

Valves are known, notably by patents EP766028, U.S. Pat. No. 3618627 and DE530601, in which the melting of a support means ensures the release of the flap support spring.

The drawback of these devices lies in the time required for the support means to melt.

The aim of the present invention is to propose a valve that overcomes such drawbacks.

Thus, the invention proposes a valve of simple and inexpensive design that overcomes both the moderate variations in pressure that appear during normal conditions of operation as well as the strong variations linked to abnormal environments (fire, seisms). Additionally, the valve according to the invention can adopt its decontainment position very rapidly.

Thus, the invention relates to a pressure control valve for a tank intended to contain a fluid and comprising at least one flap obturating an aperture linking the inside and the outside of the tank, such flap being held in the obturating position by spring means pressing on a support, such valve incorporating means allowing the retraction in whole or in part of the spring support such as to reduce the pressure exerted by the spring on the flap, such valve characterised in that the support has an embrittled part able to be fractured by a mobile piston activated by a pyrotechnic gas generator.

The support can be constituted by a tubular element on which a ring-shaped incipient fracture will be arranged that thus delimits the embrittled part on which the spring means press, said piston being integral with this embrittled part and having a direction of displacement substantially perpendicular to the axis of the tubular element.

The support can be advantageously displaced with respect to the body (for example by screwing) such as to regulate the value of the taring force exerted by the spring on the flap.

The piston can be substantially cylindrical in shape and can incorporate a drill-hole perpendicular to the piston axis and inside which the tubular element penetrates.

The piston can incorporate a shoulder onto which the pyrotechnically-generated gases will exert their pressure.

According to one variant, the piston can incorporate a firing pin intended to strike a pyrotechnic signalling device.

The pyrotechnic gas generator can be activated by electronic control means connected to at least one temperature and/or shock and/or pressure sensor.

Figure 2:
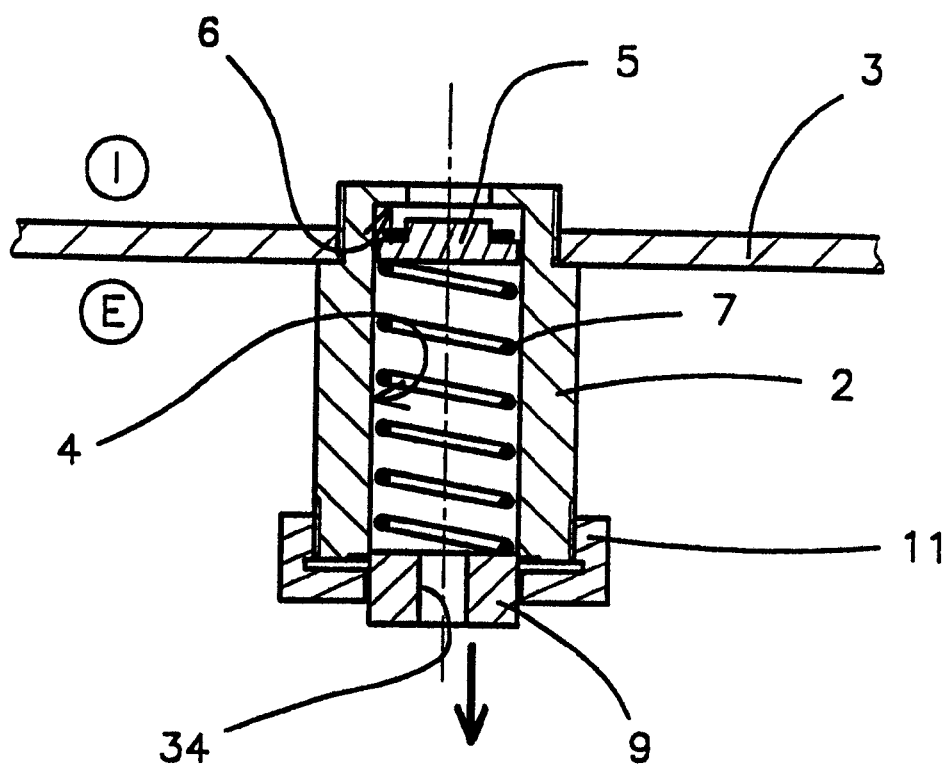
Figure 3:
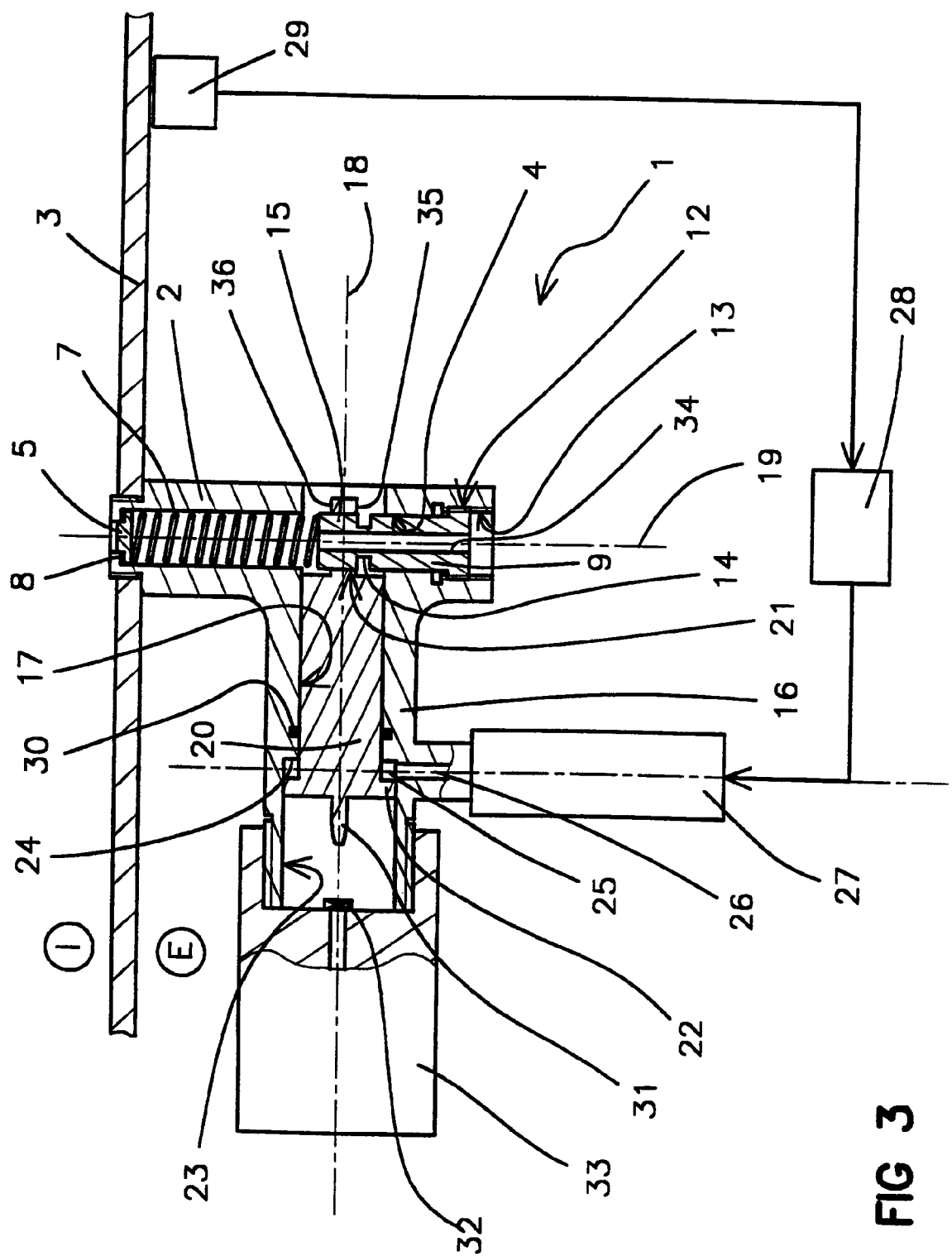
Figure 4:
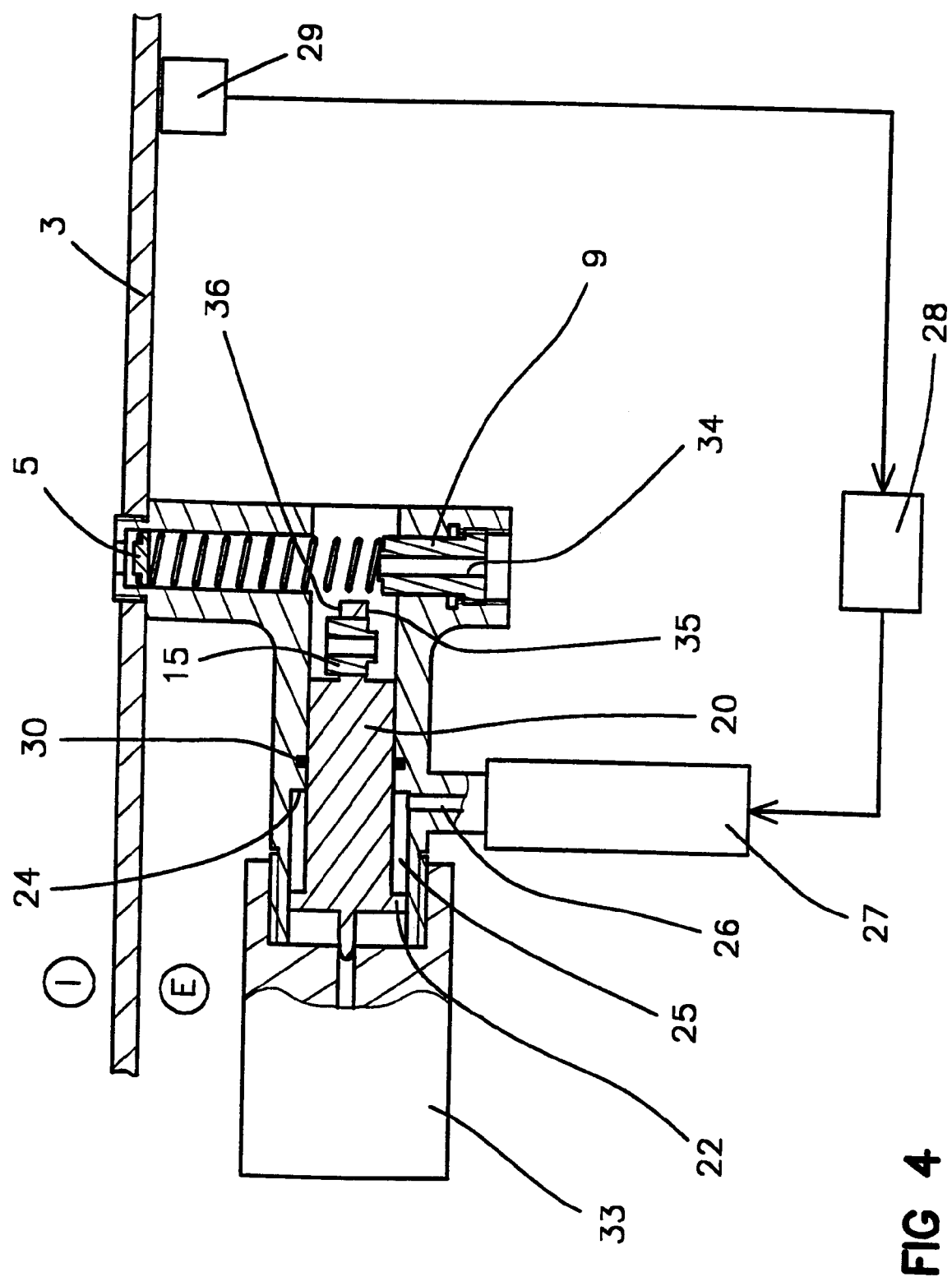

The invention will be better understood after reading the following description of the different embodiments, such description being made with reference to the appended drawings, in which:

FIG. 1 is a section view of a pressure control valve according to prior art, said valve shown in the obturated position, FIG. 2 shows this same valve in the fully opened position, FIG. 3 is a section view of a pressure control valve according to the invention, said valve being shown in the obturated position, FIG. 4 shows this same valve in the fully opened position.

With reference to FIG. 1, a valve 1 according to prior art comprises a body 2 that is fastened, for example by screwing, to a casing 3 of a tank. The tank is, for example, an automobile fuel tank, notably an LPG (liquid petroleum gas) tank. The letter I designates the inner volume of the tank, the letter E designates the outside of the tank.

The body 2 has an axial bore 4 inside which a flap 5 is placed that is held against a support 6 of the body 2 by a compression spring 7. An O-ring 8 is placed between the flap 5 and the support 6. The spring 7 presses on a support 9 that is an annular ring fitted to the bore 4.

The ring 9 is held in place with respect to the body 2 by means of locking means in the form of a washer 10, retained by a nut 11 screwed onto the body 2.

The washer is made of a material that melts at a predefined temperature (around 80 to 100° C.). The washer can, for example, be made of a plastic material or an eutectic alloy.

The washer 10 thus forms temperature-sensitive locking means for the ring 9. In the valve position shown in FIG. 1, the support ring 9 ensures a certain compression rate for the spring 7. This results in a taring force applied to the flap 5. When the pressure inside I the tank exerted upon the flap 5 is greater than the taring force applied by the spring 7, the flap gives way and release the fluid overpressure. The radial play between the flap 5 and the bore 4 is chosen to be enough to allow such an escape of fluid that runs through the drill-hole 34 in the support 9.

This way of operating is that of a classical pressure control valve able to overcome normal pressure build-ups.

When the tank is subjected to a substantial increase in temperature resulting, for example, from a fire, the washer 10 melts. The locking means for the ring 9 are thus eliminated and the spring 7 is no longer pressed against the flap 5. The taring force exerted by the spring is thus also eliminated resulting in the decontainment of the tank preventing it from exploding.

This valve has two different modes of operation each adapted to the risks caused by the tank's environment.

By way of a variant, it is possible for washer 10 and ring 9 to be made in a single part of a meltable material or else to hold a suitably dimensioned spring directly against the washer 10.

This disadvantage with this kind of valve is that the holding means are slow to melt. The passage from the normal mode of operation to the emergency mode is not quick enough. Additionally, the valve must be located directly in the vicinity of the source of heat for it to adopt a decontainment position. Whereas, in the case of the vehicle's catching fire, it is possible for the flames to appear in the vicinity of the engine well before the tank becomes over-heated. The valve according to the invention ensures rapid decontainment even if the tank has not yet over-heated. The safety level of this valve is thus greater.

FIGS. 3 and 4 show a valve according to the invention.

According to the invention, the support 9 is made in the form of a tubular element incorporating a threaded part 12 co-operating with a female threading 13 made in the bore 4 of the body 2. Screwing the support 9 allows the value of the taring force applied by the spring 7 to the flap 5 (whose structure is identical to that described with reference to FIGS. 1 and 2) to be regulated. The tubular element 9 also incorporates a ring-shaped incipient fracture 14, such as a groove, that delimits an embrittled part 15 onto which the spring 7 presses.

According to the invention, the body 2 also comprises a lateral extension 16 inside which a second bore 17 is arranged whose axis 18 is perpendicular to the axis 19 of the first bore 4.

A piston 20 is fitted sliding in this second bore 17. It is substantially cylindrical in shape and at a rear part incorporates a drill-hole 21 perpendicular to the axis 18 of the piston 20 and inside which the tubular element 9 penetrates. The drill-hole is delimited by two plane faces 35/36 milled onto the piston 20.

At a front part, the piston 20 also incorporates a shoulder 22 that is fitted in a bore 23 coaxial to a second bore 17 and of greater diameter.

Together with the bore 23 and the countersink 24 (connecting bores 23 and 17), the shoulder 22 delimits a ring-shaped chamber 25 connected by a piping 26 to a pyrotechnic gas generator 27.

Such a gas generator is well known in the field of automobile safety and will therefore not be described here in any further detail. It usually associates a gas-generating composition and an electrically-initiated squib.

The gas generator 27 is activated by electronic control means 28 connected to at least one temperature and/or pressure sensor that is preferably placed in the vicinity of the tank casing 3. Several sensors can be provided, spaced around the vehicle so as to allow the rapid detection of the beginnings of a fire even at a distance from the tank.

An O-ring 30 is placed between the piston 20 and the second bore 17 so as to ensure sealing for the gases generated by the generator 27.

Lastly, the piston 20 also comprises a firing pin 31 at its front end that is intended to ignite a squib 32 that will ignite a pyrotechnic signalling device 33, for example a coloured-smoke generating composition (such compositions are well known to the expert).

This valve operates as follows.

As for the valve in FIGS. 1 and 2, when the pressure inside I the tank exerted upon the flap 5 is greater than the taring force applied by the spring 7, the flap gives way and release the fluid overpressure. The radial play between the flap 5 and the bore 4 is chosen to be enough to allow such an escape of fluid that runs through the drill-hole 34 in the support 9.

When the tank is subjected to a substantial rise is temperature resulting, for example, from a fire, the temperature sensor 29 detects the excessive over-heating to which the tank casing 3 is subjected. By way of a variant, the sensor 29 can be a pressure sensor. In this case, it will detect any excessive pressure build-up inside the tank. The single sensor can be associated with other sensors spaced around the vehicle.

The electronic control means will process this temperature or pressure data and will activate the pyrotechnic gas generator 27.

The pressure of the pyrotechnically-generated gases is exerted inside the ring-shaped chamber 25 and on the shoulder 22 of the piston 20. Said piston is displaced in its bore and shears the support 9 at its grooved part 14. The embrittled part 15 is separated from the rest of the support 9 and is pushed away by the piston 20 (see FIG. 4).

The spring 7 is no longer pressing against the support 9. This results in the elimination of the taring force exerted by the spring and the decontainment of the tank preventing it from exploding.

At the same time, the piston 20 initiates the signalling device by means of the squib 32. Said device emits coloured smoke thereby warning persons in the vicinity of the tank that the valve has been activated.

The advantage of this invention lies in the rapidity with which the valve can adopt its decontainment position. This saves the time required to cause the locking organ to melt as would be the case for the valve in FIGS. 1 and 2.

The decontainment activation time can also be easily controlled and can be associated with various external events likely to affect safety. For this different sensors will be associated, each arranged in suitable positions. Temperature sensors may thus be combined with pressure sensors or else sensors to detect shocks occurring near the tank, for example during a road accident in the case of automobiles.

Different variants are possible without departing from the scope of the invention. It is thus possible for a pressure control valve to be designed that has no signalling device.

What is claimed is:

1. A pressure control valve (1) for a tank intended to contain a fluid and comprising at least one flap (5) obturating an aperture linking the inside (I) and the outside (E) of the tank, such flap being held in the obturating position by spring means (7) pressing on a support (9), such valve incorporating means (10, 20) allowing the retraction in whole or in part of the spring support (9) such as to reduce the pressure exerted by the spring (7) on the flap (5), such valve characterised in that the support (9) has an embrittled part (15) able to be fractured by a mobile piston (20) activated by a pyrotechnic gas generator (27).

2. A pressure control valve according to claim 1, characterised in that the support (9) is constituted by a tubular element on which a ring-shaped incipient fracture (14) is arranged that thus delimits the embrittled part (15) on which the spring means (7) press, said piston (20) being integral with this embrittled part and having a direction (18) of displacement substantially perpendicular to the axis (19) of the tubular element.

3. A pressure control valve according to claim 2, characterised in that the support (9) is displaced with respect to the body such as to regulate the value of the taring force exerted by the spring (7) on the flap (5).

4. A pressure control valve according to claim 2, characterised in that piston (20) is substantially cylindrical in shape and incorporate a drill-hole (21) perpendicular to the axis (18) of the piston (20) and inside which the tubular element (9) penetrates.

5. A pressure control valve according to claim 4, characterised in that the piston (20) incorporates a shoulder (22) onto which the gases generated by the pyrotechnic generator (27) exert their pressure.

6. A pressure control valve according to claim 1, characterised in that the piston (20) incorporates a firing pin (31) intended to strike a pyrotechnic signalling device (33).

7. A pressure control valve according to claim 1, characterised in that the pyrotechnic gas generator (27) is activated by electronic control means (28) connected to at least one temperature and/or shock and/or pressure sensor (29).

* * * * *